United States Patent [19]
Keys

[11] Patent Number: 5,256,361
[45] Date of Patent: Oct. 26, 1993

[54] METHOD FOR FORMING BODIES COMPRISING PREVIOUSLY CROSSLINKED THERMALLY STABLE RESIN AND PRODUCT MADE THEREBY

[75] Inventor: James F. Keys, West Bloomfield, Mich.

[73] Assignee: The Standard Products Company, Cleveland, Ohio

[21] Appl. No.: 887,311

[22] Filed: May 22, 1992

[51] Int. Cl.$^5$ ........................ B29C 35/02; B29C 65/02
[52] U.S. Cl. .................................. 264/236; 156/221; 264/152; 264/177.17; 264/177.19; 264/211.24; 264/248; 264/261; 264/347
[58] Field of Search ............... 264/236, 347, 211.24, 264/177.10, 177.17, 177.19, 339, 248, 261, 152; 156/221

[56] References Cited

U.S. PATENT DOCUMENTS

| | | | |
|---|---|---|---|
| 3,837,957 | 9/1974 | Mesnel | 264/236 |
| 4,183,778 | 1/1980 | Mesnel | 264/152 |
| 4,514,243 | 4/1985 | Moore et al. | 264/248 |
| 4,680,071 | 7/1987 | Candle | 264/347 |
| 4,740,336 | 4/1988 | Connen et al. | 264/516 |
| 4,834,931 | 5/1989 | Weaver | 264/261 |
| 4,964,620 | 10/1990 | Omura et al. | 264/261 |
| 5,069,849 | 12/1991 | Wain | 264/152 |
| 5,136,773 | 4/1992 | Mesnel | 264/152 |

FOREIGN PATENT DOCUMENTS

| | | | |
|---|---|---|---|
| 3408373 | 6/1986 | Fed. Rep. of Germany | 264/248 |
| 58-151233 | 9/1983 | Japan | 264/248 |
| 2132130 | 7/1984 | United Kingdom | 264/248 |

Primary Examiner—Jeffery Thurlow
Attorney, Agent, or Firm—Harness, Dickey & Pierce

[57] ABSTRACT

A method of forming a body comprising resin material which can be crosslinked to form a thermally stable resin is carried out by the sequential steps of:
(A) providing a body of resin which can be crosslinked to form a thermally stable resin;
(B) selectively crosslinking said body to provide a first zone of substantially uncrosslinked resin; a zone of substantially crosslinked resin and a transition zone therebetween;
(C) forming said first zone and transition zone; and
(D) substantially crosslinking said first zone and transition zone.

Step (C) can be carried out by introducing a first zone and associated transition zone into a mold cavity in effective contacting relationship with second zone of substantially uncrosslinked resin and associated transition zone and then step (D) can be carried out to thereby bond said first and second zone together. The present invention also relates to the products made by the method of this invention.

18 Claims, 4 Drawing Sheets

METHOD FOR FORMING BODIES COMPRISING PREVIOUSLY CROSSLINKED THERMALLY STABLE RESIN AND PRODUCT MADE THEREBY

BACKGROUND OF THE INVENTION

The present invention relates to an improved method of forming bodies comprising thermoset resins and to the product of the method. This invention is especially suitable for bonding or joining together bodies, such as bodies of extruded elongated strips comprising thermally stable, covalently crosslinked resins. The present invention especially relates to the joining of crosslinked rubber extrudates such as vulcanized elastomeric weatherstrips and trim strips.

Thermoset resins are characterized by a covalently crosslinked, thermally stable network and are in contrast to thermoplastic polymers which soften and flow under heat and pressure. Thermosetting resins usually crosslink under heat although some, such as urethanes and epoxy resins may require little or no heat. Thermosetting can occur simultaneously with polymerization or, as in the case of vulcanized rubbers, after polymerization. It will be appreciated by those skilled in the art that the present invention is broadly applicable to the class of thermoset resins, i.e., thermally stable, covalently crosslinked resin materials. However, to facilitate understanding of the invention, it is described in the context of preferred embodiments relating to extruded vulcanized rubber strips used in the automobile industry, such as weatherstrips, trim strips and glass run channel.

Weatherstrips, trim strips, glass run channel and the like are generally made by extruding uncured, i.e., unvulcanized elastomeric materials to form an extrudate which is then vulcanized and cut into suitable lengths. It is often desirable to join such lengths or strips to provide an end to end joint, a T-joint or a corner. It is also often desirable to further form a length or strip after vulcanizing to, for example, provide a bend therein. It is also often desirable to further form a length or strip after vulcanizing to, for example, provide a bend therein. Disadvantages arise, however, when joining pieces of vulcanized materials together or when bending already vulcanized materials.

One method of joining one end of a weatherstrip to another end or length thereof is to employ both extrusion and molding processes. Generally speaking, this method involves extruding unvulcanized rubber into a desired profile and vulcanizing the rubber by heating it to effect crosslinking. After the extrudate is vulcanized it is cut to the desired length to prepare it for a molding step to join it to another length of molding. For example, for a corner joint, the ends of a pair of extrudates are loaded into a corner mold and unvulcanized rubber is introduced into the mold cavity to form a corner section. The unvulcanized corner material is then heated to vulcanize it and bond it to the already vulcanized extrudate ends. The advantages of using extrusions with molded corners are well known in the field of automotive sealing and weatherstripping and trim. The use of this construction has shown steady increase in automotive sealing since its introduction.

However, the above method has the disadvantage of producing a product with unsightly joint lines at the cut ends of the elongated extrudate. Also, the joint obtained by the method is not as strong as the extrudate itself. The joint lines are due to several causes. First, when the ends of the cured extrusions are loaded into the corner mold, the mold must clamp the ends of the extrusions to withstand the cavity pressure of introduced corner material exhibited on the extrusion, therefore preventing the extrusion from being pushed out of the mold. This clamping action on the extrusion causes the extrusion to displace linearly within the extrusion clamping region. Upon mold opening at the end of the corner molding process, the displaced extrusion relaxes back to its original form due to the elastic memory of the cured rubber. This relaxation takes place unimpeded except at the joint interface between the extrusion and molded corner where the extrusion size relaxation causes stress and a dimensional step to the molded material. This dimensional mismatch causes appearance as well as functional, i.e. sealing, problems.

Another cause of unsightly joint lines is due to a difference in gloss. A gloss mismatch exists between the extrudate and the molded corner. This is due to the dissimilar processes of extrusion and molding. Because the surfaces are joined together at a distinct line, the gloss mismatch is accentuated and is therefore unattractive from an appearance standpoint.

A third cause of unsightly join lines is due to a difference in color between the extrudate molded portions. Color mismatch is unsightly and even when the same material is used for both the extrudate and molded portions of the article, variation of the material state of crosslinking can cause an objectionable color shift.

The present invention solves the above joint line problem by employing a transition zone between vulcanized and unvulcanized rubber. Thus color and/or gloss mismatches are blended over a zone or area, which blending results in a less noticeable joint. Further, the method of this invention avoids bonding unvulcanized rubber to a cut surface of vulcanized rubber. This method joins pieces of previously crosslinked resin at interfaces of uncrosslinked resin thus joining the pieces together with a strong bond by allowing uncrosslinked polymer chains to bridge the bonded area before being crosslinked. The present method also facilitates bending or other forming of an extrudate comprising vulcanized resin. Further understanding of the advantages of the present invention will be had from the following disclosure and claims taken in conjunction with the accompanying drawings.

SUMMARY OF THE INVENTION

The present invention provides a method of forming a body comprising resin material which can be crosslinked to form a thermally stable resin, said method comprising the sequential steps of:

(A) providing a body of resin which can be crosslinked to form a thermally stable resin;

(B) selectively crosslinking said body to provide a first zone of substantially uncrosslinked resin; a zone of substantially crosslinked resin and a transition zone therebetween;

(C) forming said first zone and transition zone; and (D) substantially crosslinking said first zone and transition zone.

Step (C) can be carried out by introducing a first zone and associated transition zone into a mold cavity in effective contacting relationship with second zone of substantially uncrosslinked resin and associated transition zone and then step (D) can be carried out to thereby bond said first and second zone together. The present invention also relates to the products made by the method of this invention.

DESCRIPTION OF THE INVENTION

Figure 1:
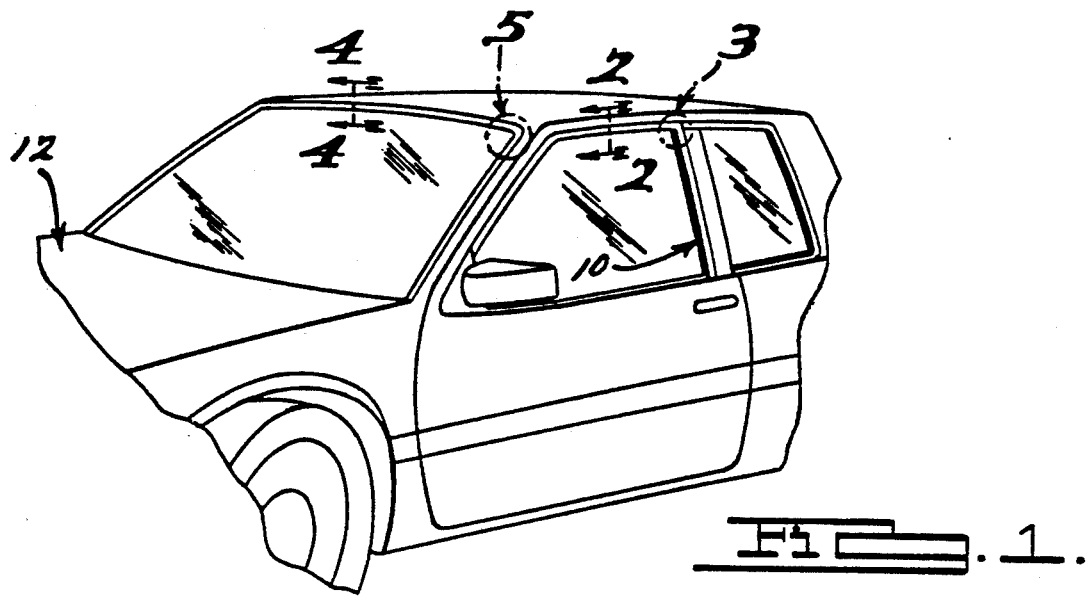
FIG. 1 is a perspective view, broken away, of an automotive vehicle having preferred embodiments of the present invention installed thereon.
Figure 2:
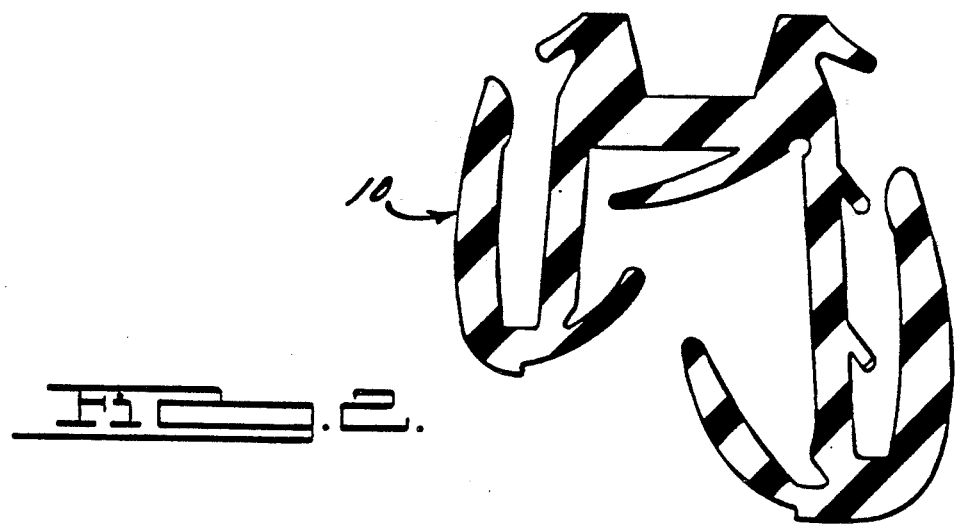
FIG. 2 is a sectional view, taken along line 2—2 of FIG. 1 and showing a glass run channel.
Figure 3:
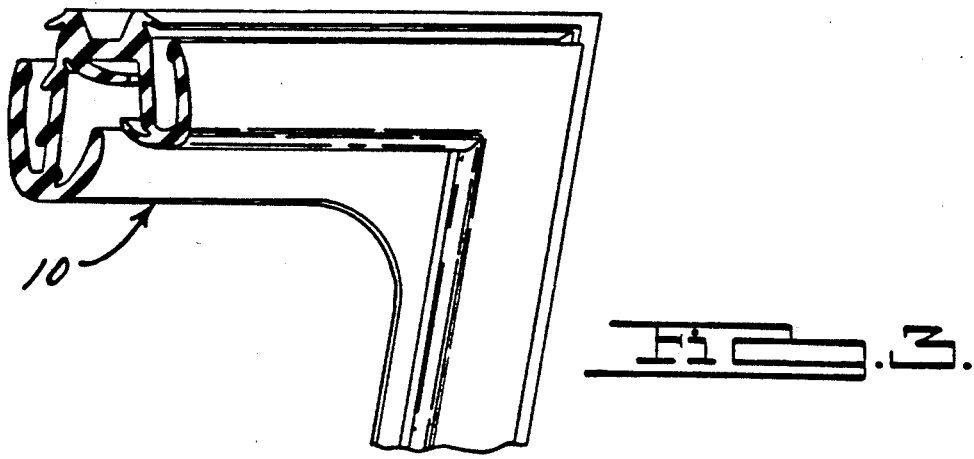
FIG. 3 is an enlarged perspective view, partially in section and broken away, of the circle in FIG. 1 indicated by the numeral 3 and showing a corner of the glass run channel.
Figure 4:
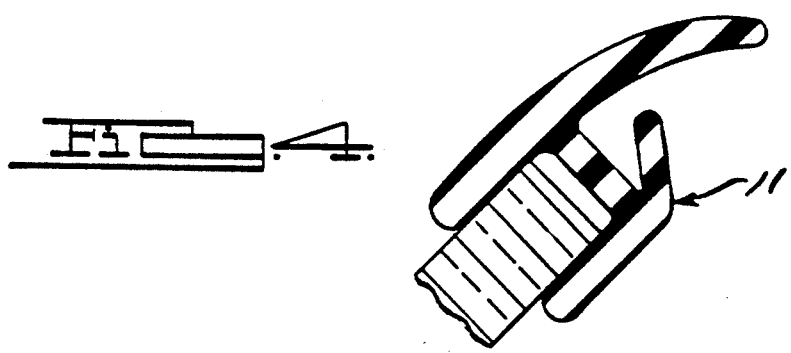
FIG. 4 is a sectional view, broken away, taken along line 4—4 in FIG. 1 and showing a windshield molding.
Figure 5:
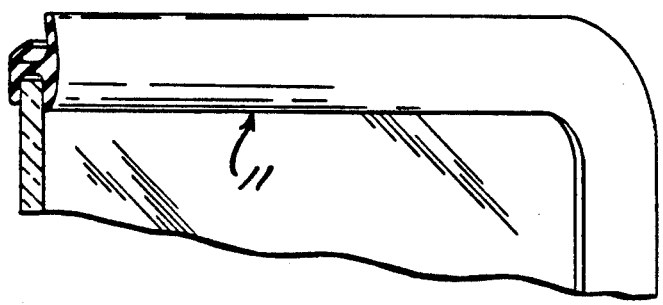
FIG. 5 is an enlarged perspective view, partially in section and broken away, of the circle in FIG. 1 indicated by the numeral 5 and showing a corner of the windshield molding.

The present invention provides a method for forming a part comprising a thermoset resin. It is especially suitable for joining two parts, or opposite ends of the same elongated part, comprising thermoset resins in a strong bond or joint but without a noticeable joint line. Broadly speaking, the present method is applicable to a broad range of thermoset resins, it being appreciated that the term "thermoset" is used herein to refer to high polymers which change irreversibly upon heating and are then thermally stable, i.e., are not thermoplastic. Thermoset resins may be set or crosslinked when heated, with or without additional "curing" agents or may be crosslinked to a thermoset condition by radiation or chemical reaction. The term thermosetting resin thus includes phenolics, alkyds, amino resins, unsaturated polyester resins, epoxy resins, silicones, urethane foams, and elastomers such as natural or synthetic rubber. Synthetic rubber includes cis-1,4-polyisoprene, polybutadiene, poly(butadiene-co-styrene (SBR)), poly(butadiene-co-acrylonitrile), poly(isobutylene-co-isoprene), poly(ethylene-co-propylene-co-diene (EPDM)), polychloroprene, polydimethylsiloxane, polyalkylenesulfide, polyester or polyether urethanes.

In accordance with a preferred embodiment of the method of the present invention, an elongated thermoset extrudate is joined to itself or another elongated thermoset extrudate by the following steps to provide a joint or bond which is strong and without a noticeable joint line. First a body of uncrosslinked thermosetting resin is selectively cured to provide a zone of substantially crosslinked thermally stable resin material, a zone having a face of substantially uncrosslinked material, and a transition zone therebetween. The face, transition zone and adjacent part is placed in a mold cavity and effectively contacted with another face, transition zone and adjacent part. Uncrosslinked thermosetting material can be introduced into the mold to effectively contact the faces. Finally, the material in the mold is crosslinked, for example, by heating.

In another preferred embodiment of the present invention the selective curing is within the body of the extrusion, i.e. instead of the uncured region being located at the end or face of the part, it is located within the elongated region. In this way the article can be reformed into a desired curvature, placed into a fixture or mold and the uncured and transition regions cured into the desired curvature.

It will be appreciated by those skilled in the art that the terms substantially uncrosslinked and substantially crosslinked are used herein to refer to relatively lowly crosslinked resin and relatively highly crosslinked resin respectively. The particular percentages of crosslinking will depend upon the particular resin involved. Relatively lowly crosslinked resin is processable material, i.e., extrudable resin. Relatively highly crosslinked to state that is stable, i.e., the resin is suitable for the desired end use.

The method of the present invention is particularly advantageous to provide glass run channel for automotive vehicles where such glass run has a corner therein. Thus, preferred embodiments of the present invention are illustrated in FIG. 1 as glass run channel 10 and windshield molding 11 installed on an automotive vehicle 12. Glass run channel 10 has a corner portion 14 and windshield molding 11 has corner portion 15 made in accordance with a preferred method of the present invention.

Figure 6:
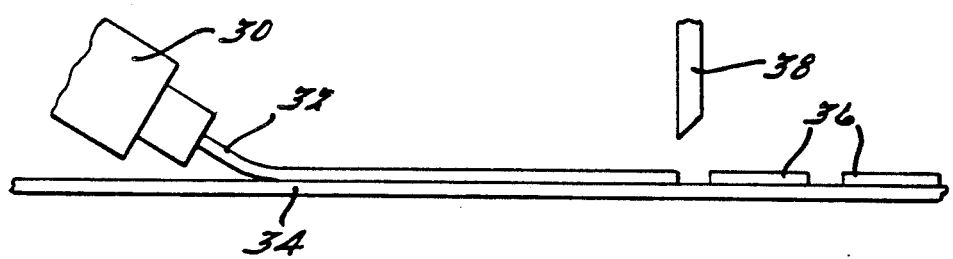
FIGS. 6-11 are perspective views, broken away, illustrating steps of a preferred method of the present invention.

A preferred method of the present invention is well illustrated in FIGS. 6-11. Referring to FIG. 6, a first step is schematically illustrated. Thus, an extruder 30 extrudes uncrosslinked, e.g., EPDM rubber extrudate 32 onto a moving belt 34. Extrudate 32 is cut into lengths 36 by blade 38.

Figure 7:
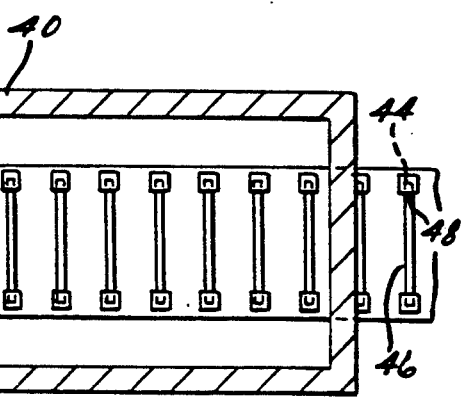

Lengths 36 are bodies of substantially uncrosslinked resin suitable for later crosslinking to form a thermally stable resin. As illustrated in FIG. 7, lengths 36 are selectively crosslinked, i.e. cured in oven 40. By selective crosslinking or curing is meant that the length is crosslinked or cured in a manner so as to provide a substantially crosslinked zone, a substantially uncrosslinked zone and a transition zone therebetween. Thus, heat insulating shields 42 are placed over the ends of lengths 36 thereby providing at the output of oven 40, lengths 36 with substantially uncrosslinked end faces 44, crosslinked length or body portions 46 and transition zones 48 therebetween.

Figure 12:
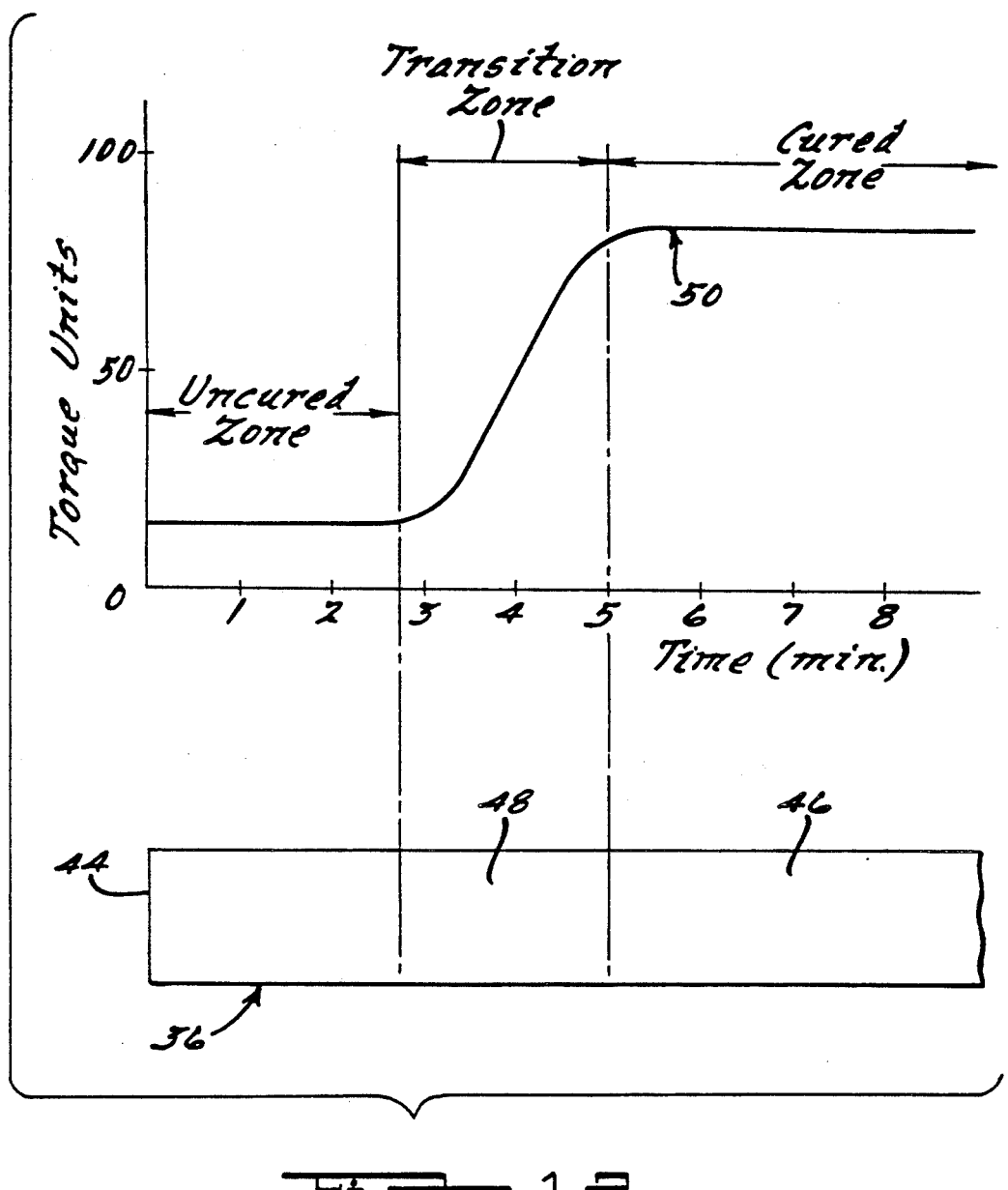
FIG. 12 is a graph illustrating the selective crosslinking of the present invention.

Further understanding of the term selective curing as used herein can be had by referring to FIG. 12. FIG. 12 shows a graph which illustrates a common material property of rubber, i.e. a rheometer curve 50. A rheometer curve is obtained by a test performed on a test machine such as the oscillating disk rheometer (ASTMD084) and is generally understood by those involved in the rubber industry as a test to measure the relative curing rate of a rubber material. In this test the material is heated to the vulcanizing temperature (typically between 200 degrees and 600 degrees F.) under positive pressure in a sealed test chamber which contains an oscillating disk. The oscillating disk is attached to a strain gauge which measures the torque required to rotate the disk while the material is maintained at the curing temperature.

Superimposed over the rheometer graph you will find 3 zones identified for clarification as: "uncured zone", "transition zone" and "cured zone". These zones are generalized to show 3 distinct states of matter in the process of vulcanizing rubber or in industry terms to show the state of cure. It is contemplated that the uncured zone is substantially uncrosslinked and the cured zone is substantially crosslinked with the transition zone representing a gradual transition between the uncured and cured zones. In the present invention it will be evident that all three zones or states of matter of an extruded article are employed to produce an extruded product with molded corners without visible joint lines between the extruded and molded portions. In the present invention, extrusions are produced in a preparatory step and cut into a unit length. However, at the region of the cut is superimposed a region of uncured zone of rubber. Additionally, adjacent to the uncured zone is material in the transition zone sandwiched between the uncured and cured zones.

FIG. 12 also illustrates an extrudate length made in accordance with this step. The state of cure zones have been superimposed from the rheometer graph to illustrate the effect of this selective curing. Thus, extrudate 36 has uncrosslinked zone 44, transition zone 48 and crosslinked body 46.

Referring back to FIG. 7, it will become evident to those skilled in the art of rubber extrusion and curing that numerous methods exist which could be utilized to produce a selectively cured rubber extrusion. For example, a cold air jet can be employed to spot cool the uncured zone while the extrudate is curing in a hot air oven. Alternatively, various other methods of selective curing employing heat transfer and energy management can be used such as: microwave suppression, radiation cure, liquid curing media, fluidized bed, evaporative cooling, shielding, insulation, etc.

It must be pointed out that while the (3) state of cure zones are illustrated with distinct cross-sectional differentiation, forms of the present invention exist in which a cross-sectional slice contains material in two or three forms. In this way only selective regions such as the show surface contain material in the uncured zone. It can also be appreciated that while the illustration depicts an extrusion produced from a single material, alternative constructions will be produced with various combinations of dense and sponge rubber compounds, metals, thermoplastic materials and fabrics utilizing various coatings dependant on application.

After the length 36 is selectively cured to provide uncrosslinked zone 44, transition zone 48 and crosslinked body 46, it is joined to another length 36 in a molding process to form a corner as illustrated in FIGS. 8-11.

Figure 8:
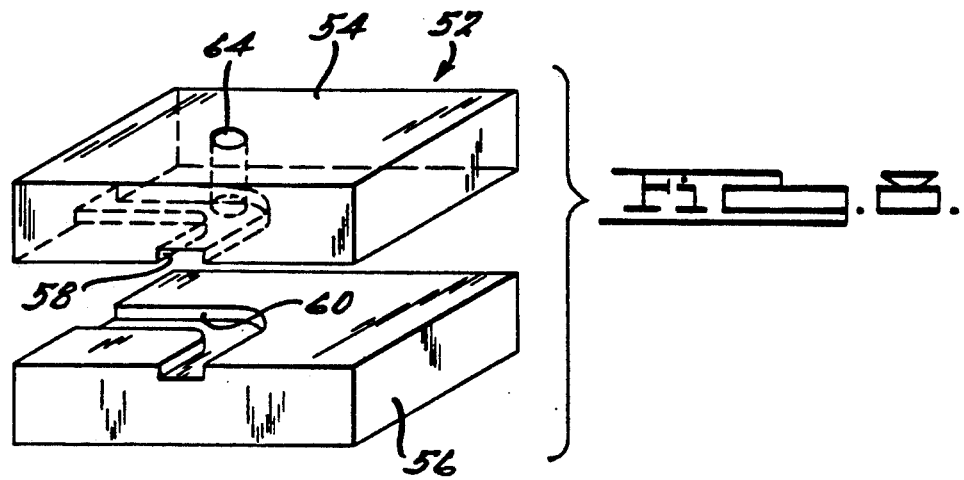
Figure 9:
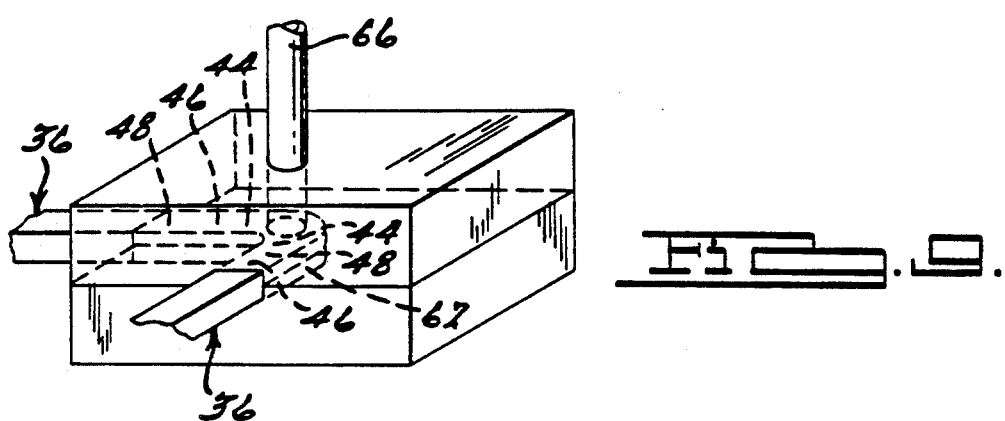
Figure 10:
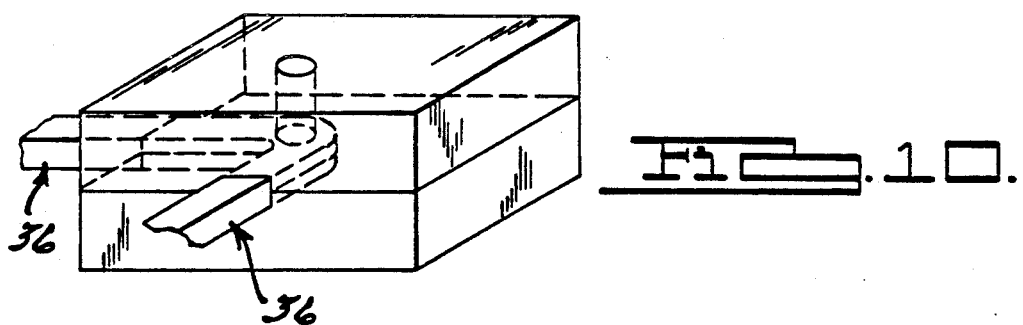
Figure 11:
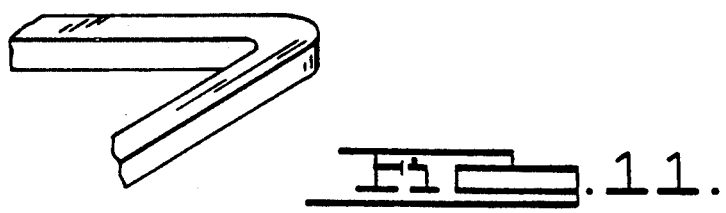

Referring to FIG. 8 an open mold 52 is illustrated. Mold 52 comprises top half 54 and bottom half 56 having channels 58 and 60, respectively, which cooperate to form mold cavity 62. Top half 54 has mold sprue 64 which is in fluid communication with channel 58 and hence mold cavity 62. It will be appreciated that, while mold 52 is suitable for molding corners, other molds for other forms or shapes can be used herein as desired. Two end portions of lengths 36 are introduced into channel 60 and mold halves 54 and 56 of mold 50 are closed to capture the end portions in mold cavity 62 as illustrated in FIG. 9. When mold 62 closes, all three state of cure zones 44,46,48 are compressed in mold cavity 62, however, faces 44 are spaced apart; thus the extrusion volume is displaced by the mismatch between mold and extrusion. Additional uncured rubber 66 is introduced into mold cavity 62 to place faces 44 in effective contacting relationship. Upon introduction of the uncured corner material 66 as shown in FIG. 10, an uncured interface exists between the extrudate faces 44 and the corner material 66, therefore forming an unnoticeable joint of the two materials. Additionally, since the introduced corner material pressurizes the uncured zone on the extrudate, any mismatch due to displaced extrusion or thermal shrinkage is transferred to the transition zone where the mismatch is blended away over the length of the zone. Through this same mechanism of blending over the length of the transition zone, both the color and gloss changes are made in a smooth, gradual "invisible" manner.

In the conventional method the cut end of the cured strip bonds to the uncured corner rubber via diffusion. Very little crosslinking can take place as the cut end is prevulcanized leaving few crosslinking sights available. When the selective curing process is used, the polymer chains are allowed to cross the boundaries of the cured extrudate through to the uncured region. The varying degree of crosslinking prior to molding allows the uncured rubber and transition region of one strip to crosslink with the uncured and transition region of a second strip.

It should be understood that while the above description deals with material being introduced into the corner mold, simpler variations of selective curing will be used to produce butt joints and mitre with or without the use of additional material or adhesive being introduced into the corner.

What is claimed is:

1. A method of forming a body comprising resin material which can be crosslinked to form a thermally stable resin, said method comprising the sequential steps of
    (A) providing a body of resin which can be crosslinked to form a thermally stable resin;
    (B) selectively crosslinking said body to provide a first zone of substantially uncrosslinked resin; a zone of substantially crosslinked resin and a transition zone therebetween;
    (C) forming said first zone and transition zone; and
    (D) substantially crosslinking said first zone and transition zone for providing a body substantially free of a visible joint line.

2. The method of claim 1 wherein step (A) is carried out by extruding said resin.

3. The method of claim 2 wherein step (B) is carried out by selectively heating said body.

4. The method of claim 3 wherein said first zone is sandwiched between two substantially crosslinked zones with a transition zone between said first zone and each one of said two substantially crosslinked zones.

5. The method of claim 4 wherein step (C) is carried out by compressing said first zone and associated transition zones in a mold cavity.

6. The method of claim 5 wherein said resin is rubber.

7. The method of claim 6 wherein said rubber is cis-1,4-polyisoprene, polybutadiene, poly(butadiene-co-styrene), poly(butadiene-co-acrylonitrile), poly(isobutylene-co-isoprene), poly(ethylene-co-propylene-co-diene), polychloroprene, polydimethylsiloxane, polyalkylenesulfide, polyester or polyether urethanes.

8. The method of claim 1 wherein said first zone is an end face portion of said body; step (C) is carried out by placing said end face in effective contacting relationship with another said face; and step (D) is carried out by crosslinking said faces into bonding relationship.

9. A method of bonding adjoining faces of a resin material which has been previously crosslinked to form a thermally stable resin comprises the steps of:
    (A) providing first and second faces of substantially uncrosslinked resin, each of said faces having an associated body of resin which has been substantially crosslinked to a thermally stable condition and first and second transition zones between each respecting face and body;

(B) introducing said first and second faces, and said first and second transition zones into a mold cavity, said faces being placed in effective contacting relationship;

(C) substantially crosslinking the resin of said first and second faces and said first and second transition zones for forming a connection between said first and second faces substantially free of a visible joint line.

10. The method of claim 9 wherein step (A) is carried out by extruding a resin and then selectively curing said resin to provide said faces, transition zones and body.

11. The method of claim 9 wherein step (C) is carried out under conditions of heat and pressure.

12. The method of claim 10 wherein said resin is rubber.

13. The method of claim 12 wherein said rubber is EPDM.

14. The method of claim 10 wherein said faces are end faces of the same elongated extrudate body.

15. The method of claim 10 wherein said faces are facing portions of different extrudate pieces.

16. The method of claim 10 wherein said faces are bonded to form a T-joint.

17. The method of claim 9 wherein said faces are placed in abutting relationship in said mold.

18. The method of claim 9 wherein said faces are placed in effective contacting relationship by introducing into said mold additional substantially uncrosslinked resin material between said faces.

* * * * *